United States Patent

Weber

[11] 4,052,869

[45] Oct. 11, 1977

[54] ANTI-THEFT DEVICE HAVING A CYLINDER LOCK

[75] Inventor: Günter Weber, Wuppertal, Germany

[73] Assignee: Neiman S. A., Courbevoie, France

[21] Appl. No.: 602,035

[22] Filed: Aug. 5, 1975

[30] Foreign Application Priority Data

Aug. 29, 1974 Germany .......................... 2441463

[51] Int. Cl.² ............................................. E05B 65/12
[52] U.S. Cl. ......................................... 70/252; 70/360; 70/455
[58] Field of Search ............... 70/186, 252, 360, 420, 70/427, 455

[56] References Cited

U.S. PATENT DOCUMENTS

| 1,736,900 | 11/1929 | Carpenter | 70/186 X |
| 3,659,444 | 5/1972 | Wellekens | 70/360 |
| 3,724,244 | 4/1973 | Schaumberg | 70/252 X |
| 3,877,265 | 4/1975 | Schaumberg | 70/252 |

FOREIGN PATENT DOCUMENTS

| 1,330,951 | 5/1963 | France | 70/186 |
| 617,554 | 2/1933 | Germany | 70/252 |
| 1,166,641 | 3/1964 | Germany | 70/186 |
| 1,352,799 | 5/1974 | United Kingdom | 70/252 |

Primary Examiner—Robert L. Wolfe
Attorney, Agent, or Firm—Nolte and Nolte

[57] ABSTRACT

A cylinder lock, particularly useful as a vehicle steering lock, of which the barrel is axially slidable between an outer, locked position and an inner position in which the barrel can be rotated by an appropriately coded key. Insertion of a key into the key passage of the barrel when the barrel is in the outer position is prevented by closure elements which are displaced by the leading end of the key, axial movement of the barrel from the outer to the inner position occurring during such displacement.

8 Claims, 10 Drawing Figures

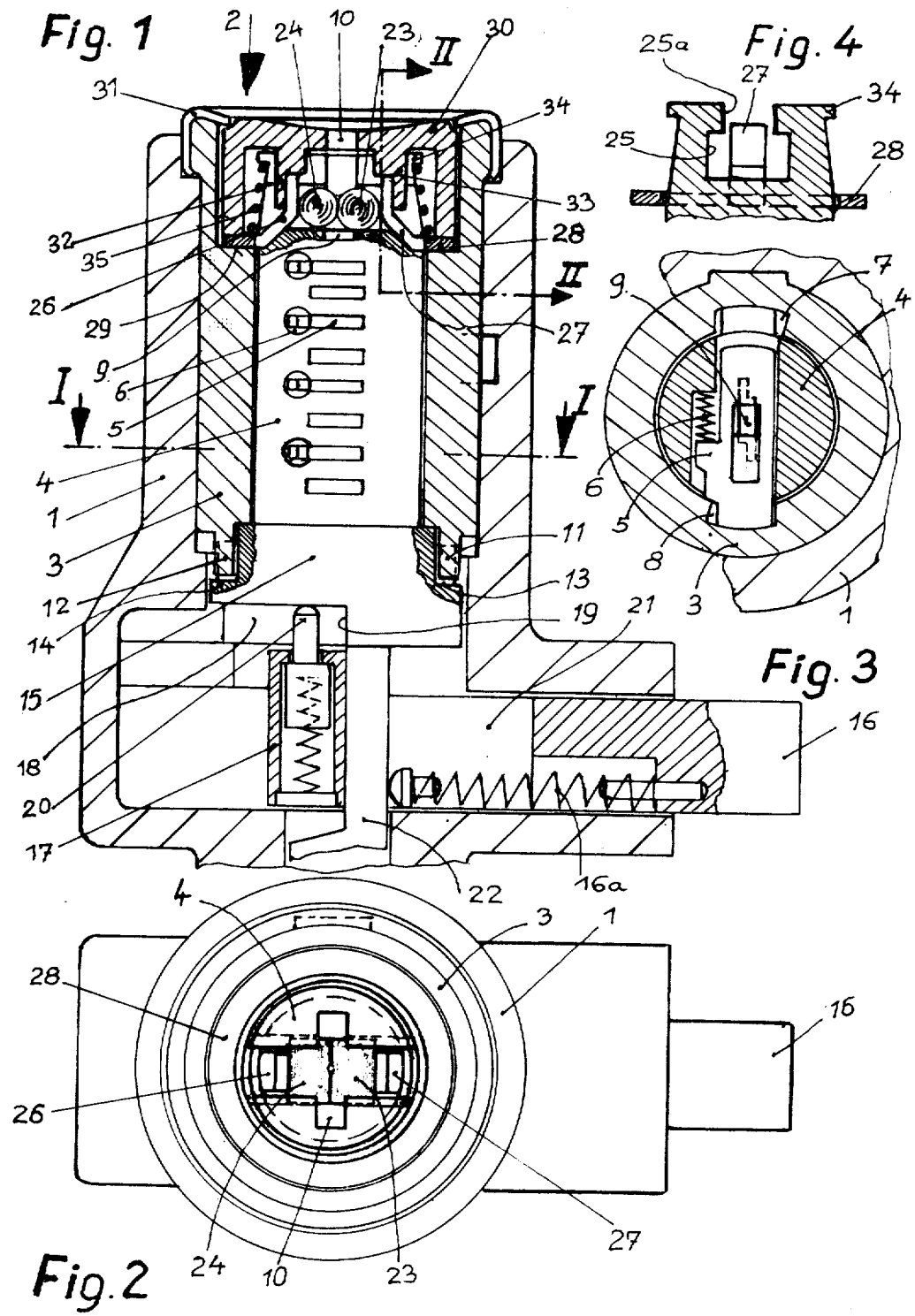

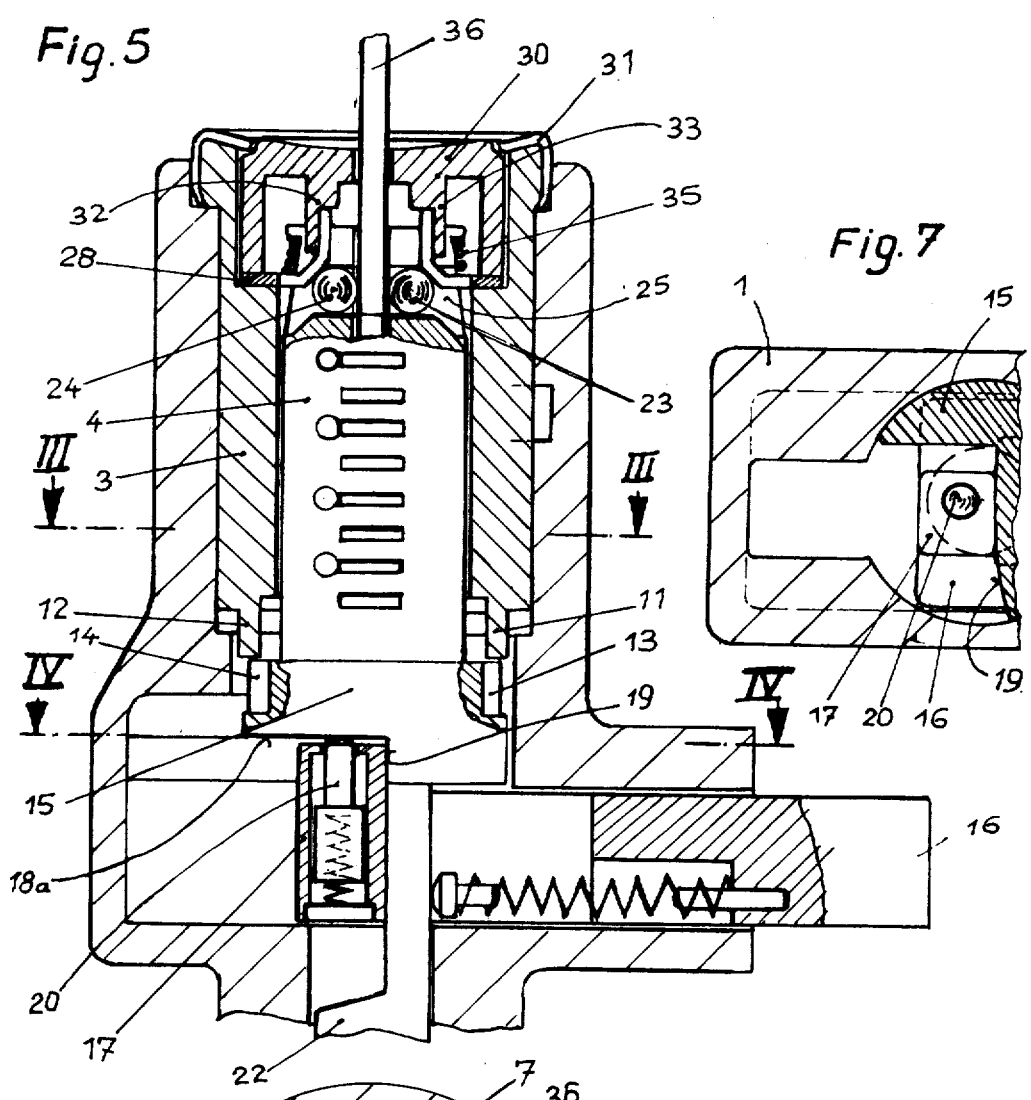
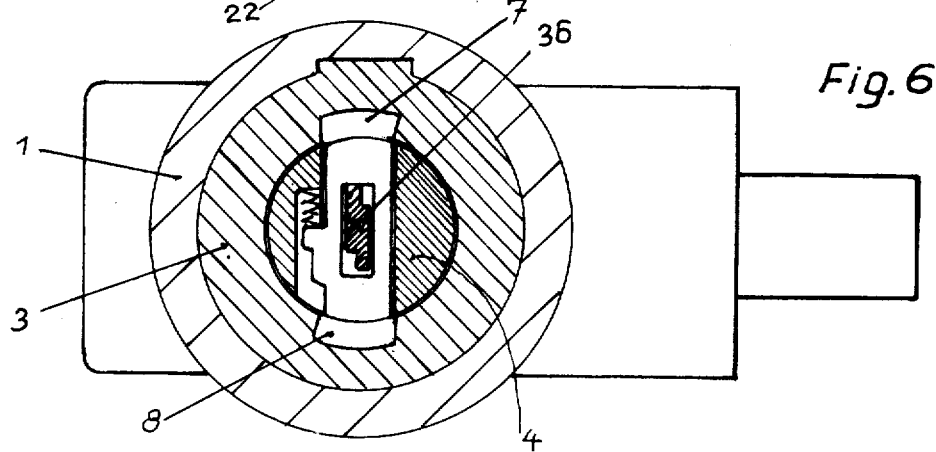

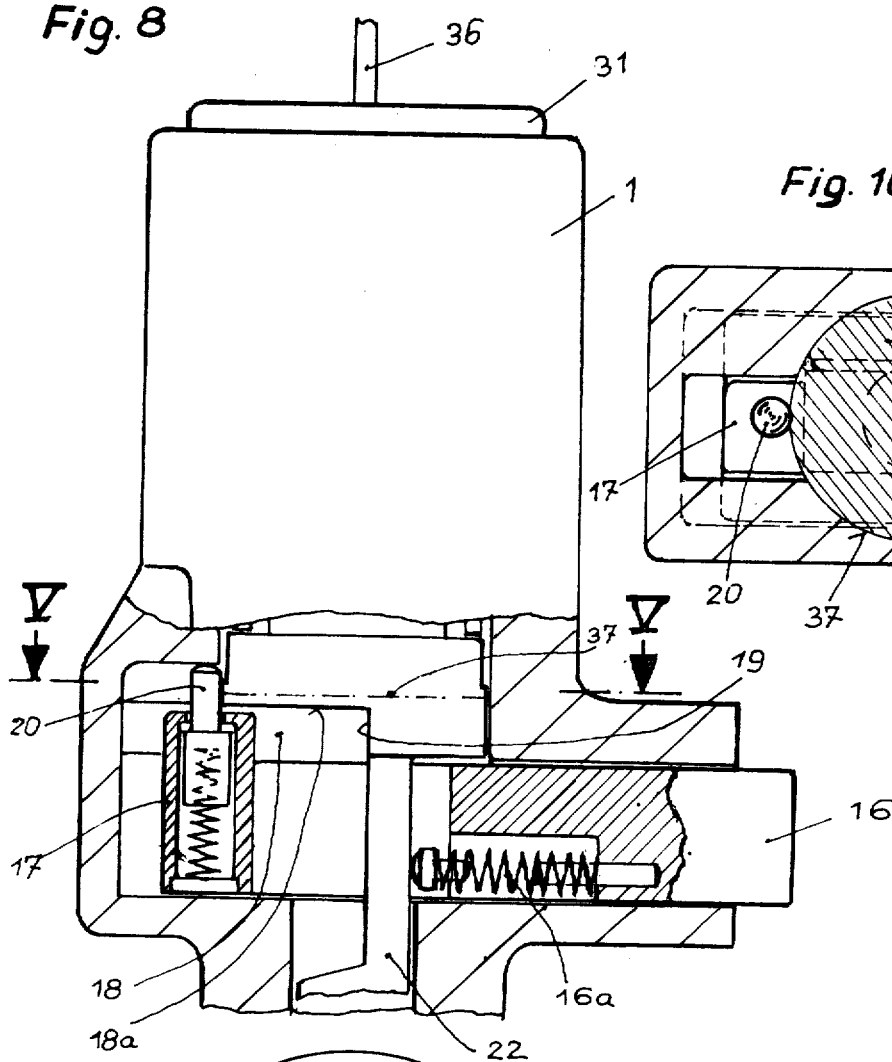
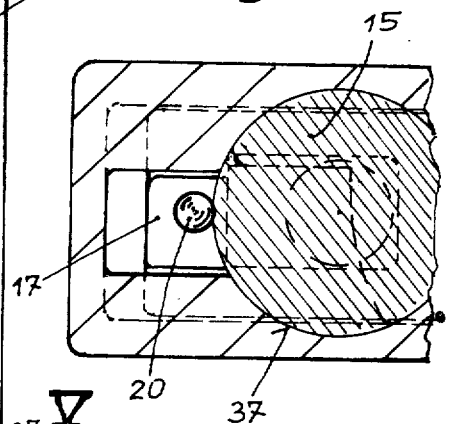
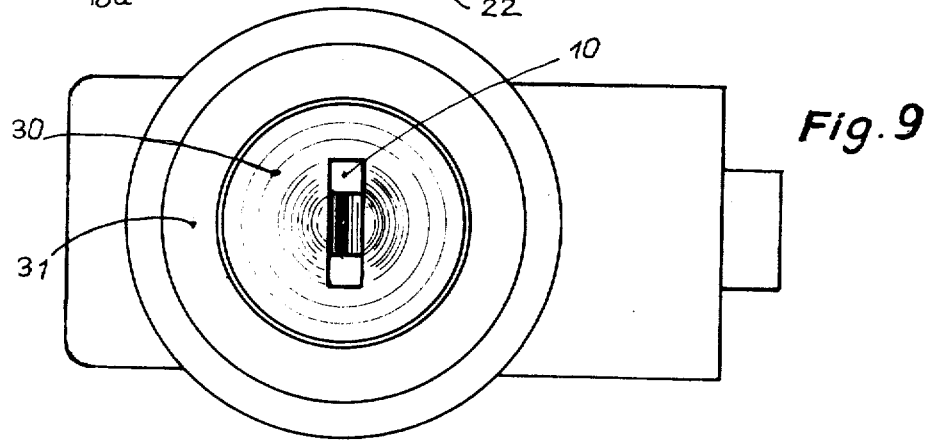

ANTI-THEFT DEVICE HAVING A CYLINDER LOCK

The invention relates to an anti-theft device having a cylinder lock, in particular for locking the steering gear of an automobile vehicle, of the type comprising a cylindrical barrel which is locked against movement in the body of the lock and can be made axially slidable by the introduction of the point or outer end of a key in the key channel against the force exerted by a spring which bears against at least one closing member disposed at the entrance of the channel, said closing member being movable axially by the thrust of the end of the key and radially when the key is withdrawn from the key channel and bearing against an axially fixed part of the lock, said barrel being rotatable in the body of the lock after an axial sliding from the stop position and the complete introduction of the key, said barrel comprising an element actuating a bolt member, said bolt member being engaged in the stop position and disengageable only after an axial sliding of the barrel and of the actuating element and rotation of said two elements to the operating position, said bolt member, after the reverse rotation to the stop position, being maintained disengaged in a pre-bolting position by said actuating element until the axial return of the barrel and of the actuating element to the stop position after complete extraction of the key.

In a known anti-theft device of this type (see French Pat. No. 71.37335 published under U.S. Pat. No. 2,115,804), the barrel is disposed in an axially fixed sleeve which is pivotable in the body of the lock. The spring bearing against the barrel in the axial direction is disposed on the side of the sleeve adjacent to the bolt member and itself bears against a disc integral with the sleeve. An extension of the barrel extends through the disc and is coupled to the bolt member actuating element constituted by a cam drum. Closing members, disposed against the rear surface of the front of the sleeve in front of the entrance of the channel, are axially and radially displaced by the end or point of the key when the latter is introduced so that these members bear against the inner surface of the front of the sleeve and cause the barrel to slide axially in opposition to the action of its return spring. After this axial sliding, the sleeve, the barrel, the spring acting on these two members, the closing members and the key constitute a movable unit which can easily rotate in the lock body, since the spring, which is compressed when the barrel is axially pushed in, has no effect of increasing the friction in the movement of rotation. In order to achieve a locking between the barrel and the lock body during the axial sliding of the barrel, openings are formed in the sleeve through which extend the stop elements or plates of the lock. The advantage of this known anti-theft device resides in the fact that the bolt member can only be engaged after the complete extraction of the key and that the barrel can easily rotate when the key is pushed in.

However, this known anti-theft device has the drawback of requiring wider general tolrances for the lock owing to the existence of the sleeve which does not serve to lock, which impairs the locking safety.

An object of the present invention is to improve the anti-theft devices of the foregoing type so as to retain the facility of rotation while increasing the safety of the anti-theft device and simplifying its manufacture.

According to the invention, there is provided an anti-theft device wherein the closing member or members are disposed in a T-shaped groove extending radially on the front face of the barrel, parts of an abutment ring bearing against the closing member or members projecting into said groove, said ring being mounted to be rotatable but axially stationary in the body of the lock, the spring which acts on the barrel bearing against said ring.

The elimination of the sleeve in the anti-theft device according to the invention ensures greater safety owing to the fact that the barrel is disposed directly in the body with narrow tolerances. The arrangement of the return spring of the barrel between the barrel and the abutment ring permits constituting by introduction of the key, after axial sliding of the barrel and compression of the spring, a pre-stressed unit constituted by the barrel, the abutment ring, the closing members and the compression spring, so that, in this pushed-in position of the barrel, the actuation of the anti-theft device by the key does not increase friction between the barrel and the adjacent parts of the anti-theft device, notwithstanding the compression of the spring.

Moreover, manufacturing costs are reduced owing to the elimination of the barrel sleeve.

Whereas in the aforementioned known anti-theft device the barrel in several parts and the actuating element for the bolt member must be manufactured separately and then assembled for example by means of a pin, in the course of a special operation, the anti-theft device according to the invention permits constructing the barrel and the actuating element in a single piece. In addition to the resulting reduction in the manufacturing cost, there is obtained the advantage that the actuating element, which has larger radial dimensions, is disposed on the side of the bolt member in the body of the anti-theft device in such manner that it is practically impossible to forcibly extract the barrel from the body in the direction in which the key is introduced. Another advantage of the construction in a single piece results from the fact that the lugs and grooves formed in the part of the actuating element facing the barrel which define the rotational path under the effect of the key, in association with the body of the anti-theft device and which, in the operating position, moreover present the axial return of the barrel, constituting integral parts of the barrel.

In one form of the invention, the spring bearing against the abutment ring is a conical spring whose end of larger diameter bears against the abutment ring and whose end having the smaller diameter bears against a flange of the front part of the barrel.

In one embodiment, a cap is pivotably mounted in the head of the body between the abutment ring and a ring for protecting said body, said cap being coupled to rotate with the barrel by lugs engaged positively in the T-shaped groove, and these lugs are radially and axially contiguous with the free ends of said parts of the abutment ring.

The advantage of those lugs resides in the fact that the cap is coupled to rotate with the barrel in the two axial positions of the latter. In this way, lack of alignment between the key introduced in the opening and the key channel is prevented. Moreover, the free parts of the abutment ring are urged in the operative direction so that safety is increased.

The invention will be understood from the ensuing description with reference to the accompanying drawings in which:

FIG. 1 is a longitudinal sectional view of an anti-theft device according to one embodiment of the invention in the stop position with the key extracted;

FIG. 2 is a plan view of the anti-theft device shown in FIG. 1, the cap having been removed;

FIG. 3 is a sectional view taken on line I—I of FIG. 1;

FIG. 4 is a sectional view taken on line II—II of FIG. 1;

FIG. 5 is similar to FIG. 1 but in respect of a position occupied after the key has been fully introduced in the stop position;

FIG. 6 is a sectional view taken on line III—III of FIG. 5;

FIG. 7 is a sectional view taken on line IV—IV of FIG. 5;

FIG. 8 is similar to FIG. 1 and partly in elevation in respect of the pre-locking position;

FIG. 9 is a plan view of the anti-theft device shown in FIG. 1, and

FIG. 10 is a sectional view taken on line V—V of FIG. 8

In a case 1, fixed to the part of a vehicle to be locked, there is mounted in the known manner, by a positive or a drive fit locking, a cylinder lock 2 so that the latter is incapable of being separated and disassembled by an unauthorized person for the purpose of releasing the locked vehicle. The lock comprises a lock body 3 and a barrel 4. In order to lock the parts 3 and 4 against rotation, plates 5 disposed in the barrel 4 are maintained by springs 6, when the key is not pushed in, in diametrally opposed axial locking grooves 7 and 8. The introduction of the key in a key channel 9 permits withdrawing the plates 5, in opposition to the action of their springs 6, so that they no longer prevent movement of the barrel 4 with respect to the body 3. In the axial position of the barrel shown in FIG. 1, the barrel is prevented from rotating not only by the plates 5 but also by the fact that lugs 11, 12, disposed at the end of the body 3 opposed to the key introduction opening 10, are engaged in corresponding cavities 13, 14 of an extension 15 of the barrel 4. Consequently, the locking of the barrel 4 against rotation with respect to the body 3 shown in FIG. 1 can only be released after introduction of the correct key and an additional axial sliding of the barrel 4 to the position shown in FIG. 5. But, even in this axial position, the barrel 4 cannot rotate freely. The extent of its rotation in this position is limited in the known manner by stops.

The extension 15 forms an actuating drum having a cam for a bolt member 16 which is movable in a direction perpendicular to the barrel 4. For this purpose, the extension 15 has a cavity 18 provided with an actuating surface 19 which cooperates with an extension 17 of the bolt member 16. The exact shape of the cavity 18 can be seen in FIG. 7. A spring-biased plunger 20 is disposed in the extension 17 and is urged toward the barrel 4. A rod 22 to which the ignition switch is connected extends from the actuating drum 15 through a cavity 21 in the form of a slot formed in the bolt member 16. The bolt member 16 is urged away from the rod 22 by a spring 16a in the direction of the aperture in the part which it must lock against rotaton. The barrel 4, the actuating drum 15 and the rod 22 are manfactured in a single piece.

When the key is not introduced, the key channel 9 is closed by two cylindrical roller 23, 24. These rollers 23, 24 are freely disposed in a T-shaped groove 25, 25a orthogonal to the key channel 9 and narrowing in the vicinity of the entrance of the key channel. Strips 26, 27 carried by a thrust ring 28 project into the groove 25, 25a and bear against the rollers 23, 24 and limit their radially outward displacement. In order to permit the rollers 23, 24 to move not only axially but also radially outwardly, the distance between the confronting strips 26, 27 increases in the direction of the bolt member 16. The ring 28 bears against an inner shoulder 29 of the lock body 3. On the opposite side, there is provided a cap 30 which is axially fixed in position in the body 3 by a retaining ring 31 covering the front face. Under the action of the shoulder 29 and the edge of the cap 30, the thrust ring 28, and with the latter the strips 26, 27 bearing against the rollers 23, 24 are axially fixed in position but pivotable. Owing to the projection of the strips 26, 27 into the T-shaped groove 25, 25a, they are driven in rotation with the thrust ring 28 when the barrel 4 is rotated. Further, the rotation of the barrel 4 also rotates the cap 30 which extends into the T-shaped groove 25, 25a by its lugs 32, 33 disposed on its inner face. A conical coil spring 35, disposed between the thrust ring 28 and a flange 34 of the head of the barrel 4, produces the return of the barrel 4 after extraction of the key.

In starting at the locking position of the anti-theft device, in which the bolt member 16 under the action of a spring 16a has bolted the part of the vehicle to be locked, the operation is as follows:

In the position shown in FIG. 5, the key 36 has been fully introduced. The plunger 20 of the extension 17 of the bolt member is depressed against the action of its spring by the front face 18a of the cavity 18 of the actuating drum 15. The projecting part of the bolt member extension 17 is in facing relation with the actuating surface 19 of the drum 15. The return of the barrel 4 and drum 15 is prevented in this position by the axially and radially displaced rollers 23, 24 against which the barrel 4 bears and which bear against the wide faces of the key 36 and the strips 26, 27. The rollers 23, 24 are brought to this position before the key can penetrate the key channel 9 by the axial and radial displacement of the rollers 23, 24, occurs in opposition to the action of the spring 35 which is therefore compressed. Owing to the fact that, in the compressed position of the spring 35, its force only acts between the flange 34 of the barrel, the thrust ring 28, the rollers 23, 24 and the key 36 located therebetween, these elements constitute a pre-stressed assembly which produces no increase in the friction on the other parts of the anti-theft device. Consequently, the barrel and the parts which are connected to rotate therewith can be easily rotated in the position shown in FIG. 5.

The rotation of the barrel 4 produces the retraction of the bolt member 16 in opposition to the action of its spring 16a as the extension 17 slides on the actuating surface 19. The plunger 20, under the action of its spring, engages against the peripheral surface 37 of the drum 15 (FIG. 8) so that, even after the extension 17 of the bolt member ceases to bear against the actuating surface 19, the bolt member 15 is retained in its withdrawn position. The anti-theft device remains in this pre-locking position so long as the front end or point of the key has not left the key channel, since it is only after the complete extraction of the key that the rollers 23, 24 can return to their position shown in FIG. 1, the spring 35 extending upon the return of the barrel 4. The return of the barrel results in the return of the actuating drum 15 connected thereto to a position in which the plunger 20 of the extension 17 of the bolt member is no longer retained by the peripheral surface 37 but moves in the cavity 18. This displacement is due to the action of the bolt member spring 16a.

The particular advantages of the invention reside in a stronger and simpler construction with greater safety due to the fact that, in eliminating the barrel sleeve, the general tolerances are narrower and the barrel, the actuating drum and the rod can be made in one piece so that the barrel can be protected in a simpler manner against an unauthorized disassembly simply by giving the drum 15 a diameter greater than that of the barrel 4. Nothwithstanding the elimination of the barrel sleeve, the barrel and the parts connected to rotate therewith can be rotated just as easily as those of known locks.

What is claimed is:

1. An anti-theft device comprising a lock body, a cylindrical barrel rotatably mounted in said body and including an axial passage for insertion of a key, locking means in said barrel engaging said body to prevent rotation of said barrel, said locking means being operable by insertion of a correctly coded key to free the barrel for rotation within the body, said barrel being axially slidable within said body between an outer, locked position and inner, operative position, closure means disposed at an entrance end of said axial passage and movable between a first position in which said means is effective to prevent insertion of a key into said passage in said outer position of said barrel and second position to allow insertion of the key into said passage in the inner, operative position of said barrel, and means biasing said closure means towards said first position, pressure applied to said closure means against the action of said biasing means by the leading end of the key, moving said barrel to said operative position and thereafter moving said closure means to said second position to allow insertion of said key into said passage, said barrel including an operating part rotatable therewith and cooperating with a bolt element to move that element between locking and releasing positions, said barrel being formed at that end thereof from which a key is inserted therein, with a T-sectioned slot, said closure means being guided for axial radial movement therein, a thrust ring disposed between opposed surfaces of said body and barrel and rotatable with said barrel, said ring including elements projecting into said slot and cooperating with said closure means, means biasing said barrel towards said outer position, and wherein a cap is rotatably mounted at that end of the barrel from which said key is inserted and between the thrust ring and a ring protecting said body, said cap being coupled to rotate with the barrel by lugs positively engaged in the T-shaped groove, said lugs being radially and axially contiguous with free ends of said parts of the thrust ring.

2. An anti-theft device comprising a lock body, a cylindrical barrel rotatably mounted in said body and including a axial passage for insertion of a key, locking means in said barrel engaging said body to prevent rotation of said barrel, said locking means being operable by insertion of a correctly coded key to free the barrel for rotation within the body, said barrel being axially slidable within said body between an outer, locked position and an inner, operative position, closure means disposed at an entrance end of said axial passage and movable between a first position in which said means is effective to prevent insertion of a key into said passage in said outer position of said barrel and a second position to allow insertion of the key into said passage in the inner, operative position of said barrel, and means biasing said closure means towards said first position and said barrel towards said outer position, pressure applied to said closure means against the action of said biasing means by the leading end of the key, moving said barrel to said operative position and threafter moving said closure means to said second position to allow insertion of said key into said passage, said barrel including an operating part rotatable therewith and cooperating with a bolt element to move that element between locking and releasing positions, said barrel being formed, at said entrance end, with a key-sectioned slot, said closure means being guided for axial and radial movement therein, a thrust ring disposed between opposed surfaces of said body and barrel and rotatable with said barrel, said ring having at least two arms projecting therefrom into said slot, said biasing means comprising a compression spring coacting between said ring and said barrel.

3. An anti-theft device as claimed in claim 2 wherein the barrel and the operating part cooperating with the bolt member are in one piece.

4. An anti-theft device as claimed in claim 3, wherein the operating part is an actuating drum having radial dimensions exceeding those of the barrel.

5. An anti-theft device as claimed in claim 2 wherein the compression spring coacting between the thrust ring and the barrel is a conical spring the larger diameter end of which bears against the thrust ring and the smaller diameter end of which bears against an annular collar of the barrel at that end thereof from which a key is inserted.

6. Apparatus as claimed in claim 2 wherein said closure means comprises a pair of cylindrical rollers and wherein said arms of said ring contact said rollers.

7. Apparatus as claimed in claim 6 wherein said biasing means comprises a conical spring disposed around said barrel and extending between said ring and an annular collar.

8. An anti-theft device as claimed in claim 2 wherein latch means are associated with said bolt and cooperate with said operating part to hold said bolt element in said releasing position until said barrel is returned to said outer locked position.

* * * * *